United States Patent [19]

Blanding

[11] Patent Number: 5,946,023
[45] Date of Patent: Aug. 31, 1999

[54] MOUNT FOR BEAM SHAPING OPTICS IN A LASER SCANNER

[75] Inventor: Douglass L. Blanding, Rochester, N.Y.

[73] Assignee: Eastman Kodak Company, Rochester, N.Y.

[21] Appl. No.: 09/078,119

[22] Filed: May 13, 1998

[51] Int. Cl.⁶ .................................................. B41J 2/47
[52] U.S. Cl. ........................ 347/257; 347/242; 347/256
[58] Field of Search .................................. 347/242, 245, 347/257, 262, 263, 256; 355/43

[56] References Cited

U.S. PATENT DOCUMENTS

| | | | |
|---|---|---|---|
| 4,318,135 | 3/1982 | Allis et al. ............................... | 358/474 |
| 4,928,119 | 5/1990 | Walker et al. ........................... | 347/263 |
| 5,093,685 | 3/1992 | Blanding .................................. | 355/43 |
| 5,181,304 | 1/1993 | Piotrowski ............................... | 29/271 |
| 5,214,441 | 5/1993 | Blanding et al. ........................ | 347/257 |
| 5,237,348 | 8/1993 | Blanding et al. ........................ | 347/138 |
| 5,255,015 | 10/1993 | Noethen et al. ........................ | 347/257 |
| 5,294,943 | 3/1994 | Blanding et al. ........................ | 347/257 |
| 5,383,790 | 1/1995 | Kerek et al. ............................. | 118/726 |
| 5,392,662 | 2/1995 | Jadrich et al. .......................... | 74/89.15 |
| 5,550,669 | 8/1996 | Patel ........................................ | 359/224 |
| 5,771,061 | 6/1998 | Komurasaki et al. .................. | 347/242 |

*Primary Examiner*—N. Le
*Assistant Examiner*—Hai C. Pham
*Attorney, Agent, or Firm*—Thomas H. Close

[57] ABSTRACT

A laser printer of the type having predeflector components and postdeflector components is assembled by aligning the predeflector components on a bar and aligning the bar with a printer frame assembly having the postdeflector components in an alignment fixture. After the bar and printer frame have been aligned in the fixture, they are mechanically attached using flexures between the bar and the printer frame such that the bar and printer frame are constrained from moving relative to each other. Finally, the assembled components are removed from the alignment fixture.

7 Claims, 5 Drawing Sheets

MOUNT FOR BEAM SHAPING OPTICS IN A LASER SCANNER

CROSS REFERENCE TO RELATED APPLICATIONS

Reference is made to U.S. Ser. No. 09/078,333, filed May 13, 1998, entitled "Precision Assembly Technique" by Douglass L. Blanding, and to U.S. Ser. No. 09/078,296, filed May 13, 1998, entitled "Precision Assembly Technique Using Alignment Fixture and the Resulting Assembly" by Mark Bedzyk and Douglass L. Blanding.

FIELD OF THE INVENTION

The invention relates to laser scanners and more particularly to a mount for the beam shaping optics in a laser scanner.

BACKGROUND OF THE INVENTION

Laser printers that use a modulated laser beam to write images on a photosensitive or thermally sensitive medium such as film or paper are well known in the art. It is common practice to employ a means for deflecting the modulated laser beam into a raster pattern on said medium so that the image will be written line by line in a raster fashion. FIG. 1 shows an example of a configuration of optical components which is fairly typical of such a laser printer. Any given laser printer design may have fewer or more numerous components, but will bear a general resemblance to the configuration shown in FIG. 1. The operation of the laser printer 10 is as follows.

An optical coupler 12 contains a source of laser energy (such as the end of a fiber optic 13 through which laser light is conducted from a laser diode 15, or the laser diode itself) and a lens (not shown). The purpose of the lens in the optical coupler is to collect the laser energy emitting from the source and focus it to a beam waist 14. The laser energy which shall now be referred to as a laser beam, is propagated in a direction which is commonly referred to as the "Z axis direction". As the beam travels from the waist 14, the size of the beam becomes larger; it diverges. The laser beam next encounters cylindrical mirror 16, which is inclined, causing the axis of the reflected beam to be at an angle $\alpha$ with respect to the axis of the incident beam. The cylindrical shape of mirror 16 causes the beam to be focused on a print medium 19 in the scan direction A but has no effect on the beam in the cross-scan direction B. The beam next encounters cylindrical mirror 18 which is also inclined, causing the axis of the reflected beam to be at an angle $\beta$ with respect to the axis of the incident beam. Typically the angles $\alpha$ and $\beta$ will be equal so that the axis of the beam as it leaves mirror 18 will be parallel to the axis of the beam as it approaches mirror 16. The purpose of mirror 18 is to focus the beam on the deflecting mirror 20 in the "cross-scan" direction (orthogonal to the scanning direction). The deflecting mirror 20 is shown to be a polygon with axis of rotation C, but it could have been a single mirror mounted on the shaft of a galvanometer. The purpose of the rotation of mirror 20 about axis C is to produce the scan lines 22 on the print medium 19. After being reflected off mirror 20 the beam next encounters flat mirror 24, which is inclined so as to direct the beam toward cylindrical mirror 26. The beam continues to converge in the scan direction but now diverges in the cross-scan direction. Next, the beam encounters cylindrical mirror 26 which is inclined so as to direct the beam toward the print medium 19. The cylindrical shape of mirror 26 is designed to image the polygon (mirror 20) onto the scan line 22. This renders the system insensitive to so called "pyramid error" of the polygon. Finally, the print medium 19 is moved at a steady speed in the cross-scan direction B causing successive lines to be written at a uniform spacing on the medium.

It is a characteristic of printers of the type just described to be capable of writing extremely high resolution images having extremely fine lines and sharp detail in both the scan direction and the cross-scan direction. However, in order to achieve the very high resolution of which the printer is capable, all of the optical components must be very precisely manufactured and positioned. Even a positional error of a few microns can cause a noticeable degradation of the printer's performance. For this reason, it is of the greatest importance in the manufacture of such precision apparatus that great care be taken in assuring that critical components be very accurately and precisely mounted in place.

There are different approaches that have been taken in the factory to achieve this result. One approach is to specify very tight dimensional tolerances on all parts having dimensions which contribute to the determination of the final location of components required to be precisely and accurately mounted. Unfortunately, this approach can be expensive. Parts with very tight dimensional tolerances can cost a lot more than parts with ordinary commercially typical tolerances.

Another approach is to design position adjustment mechanisms into the apparatus which have knobs that can be used to "dial in" the exact position of the critical components. For example, a knob might be provided on the apparatus which, when turned, would cause the laser to move along the optical axis (the Z axis), allowing its precise focal position to be set. Other knobs might be provided to make adjustment in other critical directions, such as X and Y. Also, knobs might be provided to make rotational adjustment of critical components. It is easy to imagine that if a component were to be mounted so that its precise position could be set with knobs, those knobs with their associated hardware and brackets could get to be fairly bulky and complicated. Also, all this additional hardware would add considerable additional expense to the apparatus.

Another approach is to design the positioning hardware and knobs to be part of a factory fixture, then fixing the precision components in place on the apparatus after the components have been precisely aligned, for example by using an adhesive such as potting compound or epoxy. In this way, the apparatus is kept inexpensive by using parts with ordinary commercially typical tolerances while still achieving very accurate and precise positional location of the critical components. The factory fixture would, however, be fairly elaborate and expensive, since it would contain the position adjusting hardware and knobs. However, this fixture would be used over and over again to align many, many products. So its expense, when divided among the many products aligned on it, would be insignificant.

There are, however, drawbacks of using adhesive to fix the parts in position. One of them is that one must wait for the adhesive to cure before removing the hardware apparatus from the fixture. This requires that the apparatus must reside on the fixture for some additional time while curing takes place. This, of course, reduces the number of hardware units which can be manufactured by this fixture in a given span of time. To improve this situation, quick curing adhesive may be specified, such types as "5 minute curing" epoxy or "instant UV curing" adhesive. The idea with using the UV curing adhesive is to get instant curing (but weak strength) while the apparatus is on the fixture, then carefully remove it from the fixture and apply some additional adhesive which is more durable and allow overnight curing off line. For many purposes, the 5 minute curing epoxy is durable enough to provide a lasting bond. Fixing with adhesive also has some other drawbacks. One drawback is that as the adhesive cures, it shrinks somewhat. This may produce some unwanted residual stress or positional error in the location of the component(s) being assembled. Some other drawbacks of adhesive are that it must be carefully stored and used so as not to have it "go bad" on the shelf or in the pot. Adhesives have limited shelf life and for reasons just previously discussed, a very short pot life. Still another disadvantage of adhesive assembly is that after an apparatus is assembled, if any component fails, then rework is difficult if not impossible. Once the adhesive is cured, the parts cannot be disassembled and reassembled. The adhesive forms a permanent bond.

The optical performance of the laser printer is especially sensitive to the spacing and angles between the coupling 12 and the mirrors 16 and 18 (the so called pre-deflector components), so these must be precisely controlled. Unfortunately, the tolerances of the components are large enough so that even if one could position each component perfectly in its nominal designed position, the optical performance of the system would be sub-optimum. In addition to the tolerances on the components themselves, we must allow for tolerances in the mechanical hardware which will be used to mount these components. To achieve the necessary degree of accuracy in the positioning of the pre-deflector components it is customary to use a combination of fine micrometer adjustments and mounting hardware which is manufactured to very tight tolerances. The unfortunate result of this approach is that it is expensive because of both the tight tolerances and the "on board" adjustments.

There is a need therefore for an improved method of positioning the optical components in a laser printer. In particular, there is a need for achieving the very precise position of the "pre-deflector" components (optical coupler 12, mirror 16, and mirror 18).

SUMMARY OF THE INVENTION

According to the present invention, a laser printer of the type having pre-deflector components and post-deflector components is assembled by aligning the pre-deflector components on a bar and aligning the bar with a printer frame assembly having the post-deflector components in an alignment fixture. When the bar and printer frame have been properly aligned in the fixture, they are mechanically attached using flexures between the bar and the printer frame such that the bar and printer frame are constrained from moving relative to each other. Finally, the assembled components are removed from the alignment fixture.

ADVANTAGES OF THE INVENTION OVER THE PRIOR ART

This invention achieves a lower cost means for mounting the pre-deflector components and insures that the pre-deflector components will remain in their correct positional alignment.

DETAILED DESCRIPTION OF THE INVENTION

Figure 1:
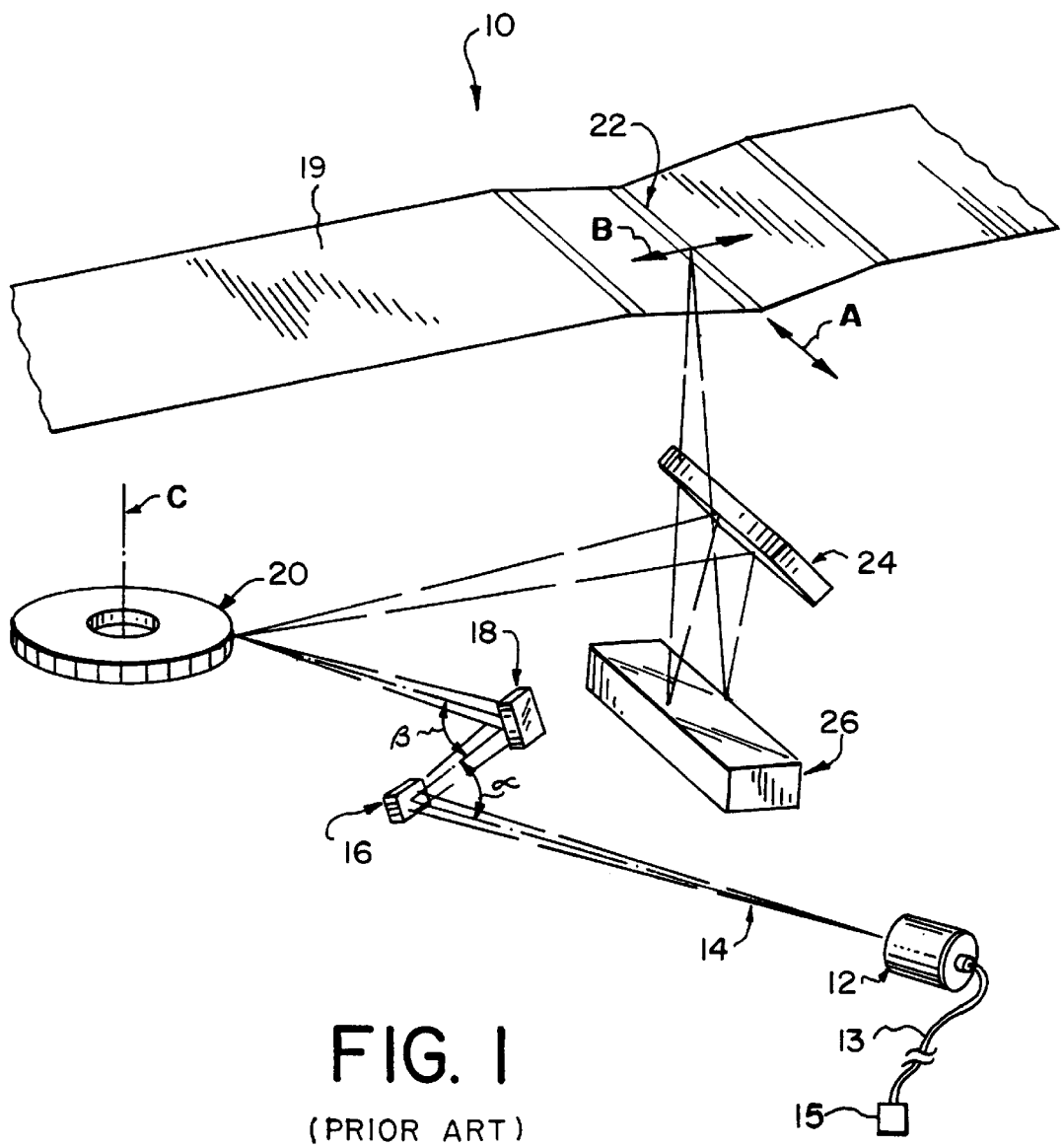
FIG. 1 is a schematic diagram of the optical system of a laser printer according to the prior art.
Figure 2:
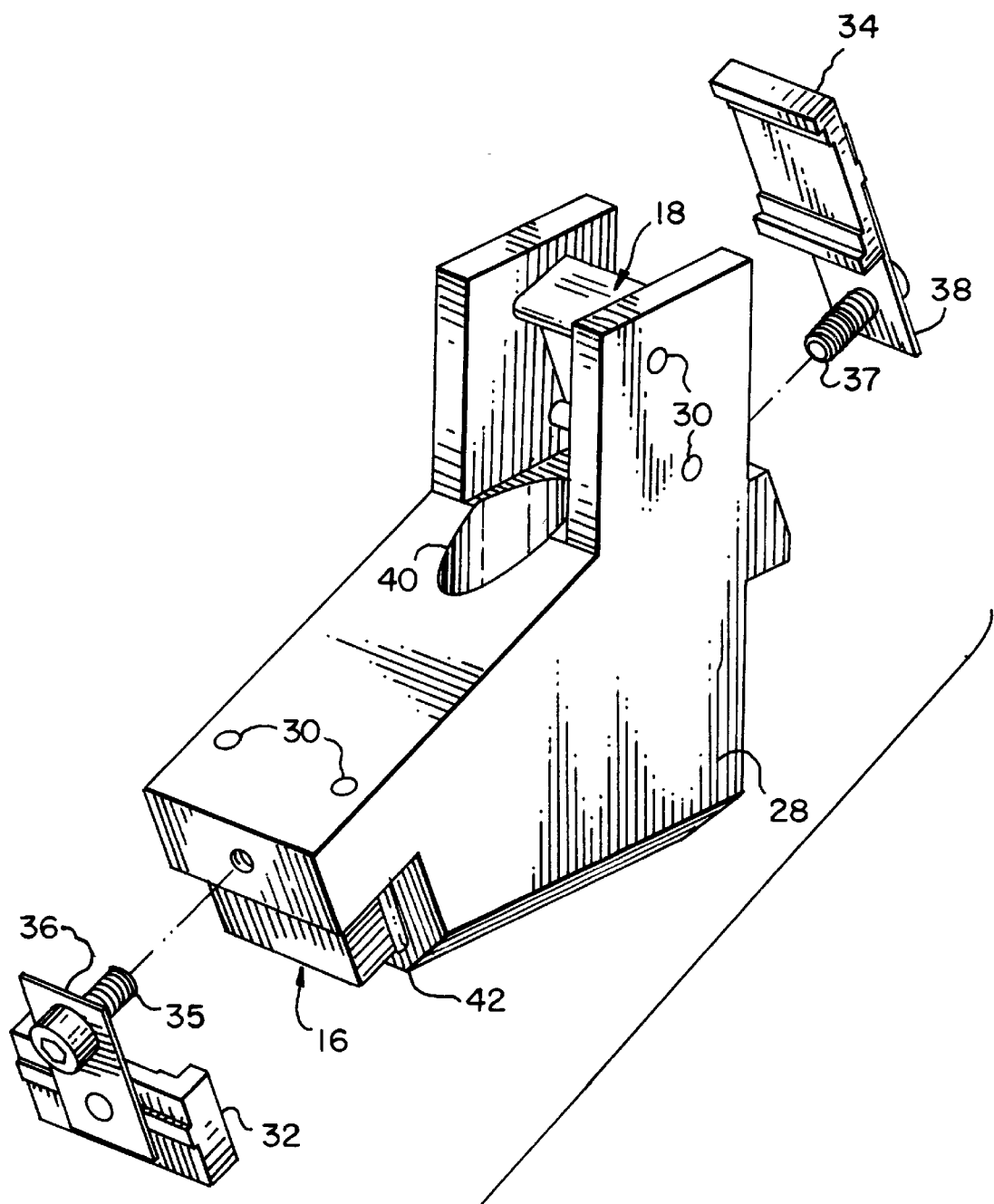
FIG. 2 is an exploded perspective showing a pre-deflector mirror mounting block employed with the present invention.

Referring to FIG. 2, the pre-deflector mirrors 16 and 18 are mounted in a block 28. Each of the mirrors 16 and 18 is positioned by a pair of pins 30 whose axes are parallel to the axis of their respective cylinder mirror 16 or 18. A nesting force to urge the mirrors into contact with the alignment pins is provided by pads 32 and 34 which are urged into the backs of the mirrors 16 and 18 respectively by flat springs 36 and 38. The flat springs 36 and 38 are secured to the block by screws 35 and 37. The required degree of accuracy of angle $\alpha$ and angle $\beta$ of mirrors 16 and 18 are easily achieved by ordinary tolerances of the dimensions of block 28. A hole 40 in block 28 allows passage of the laser beam. Block 28 is provided with a V-shaped reference surface 42 for use in aligning the mirrors 16 and 18 with the optical coupler 12 as will be described below.

Figure 3:
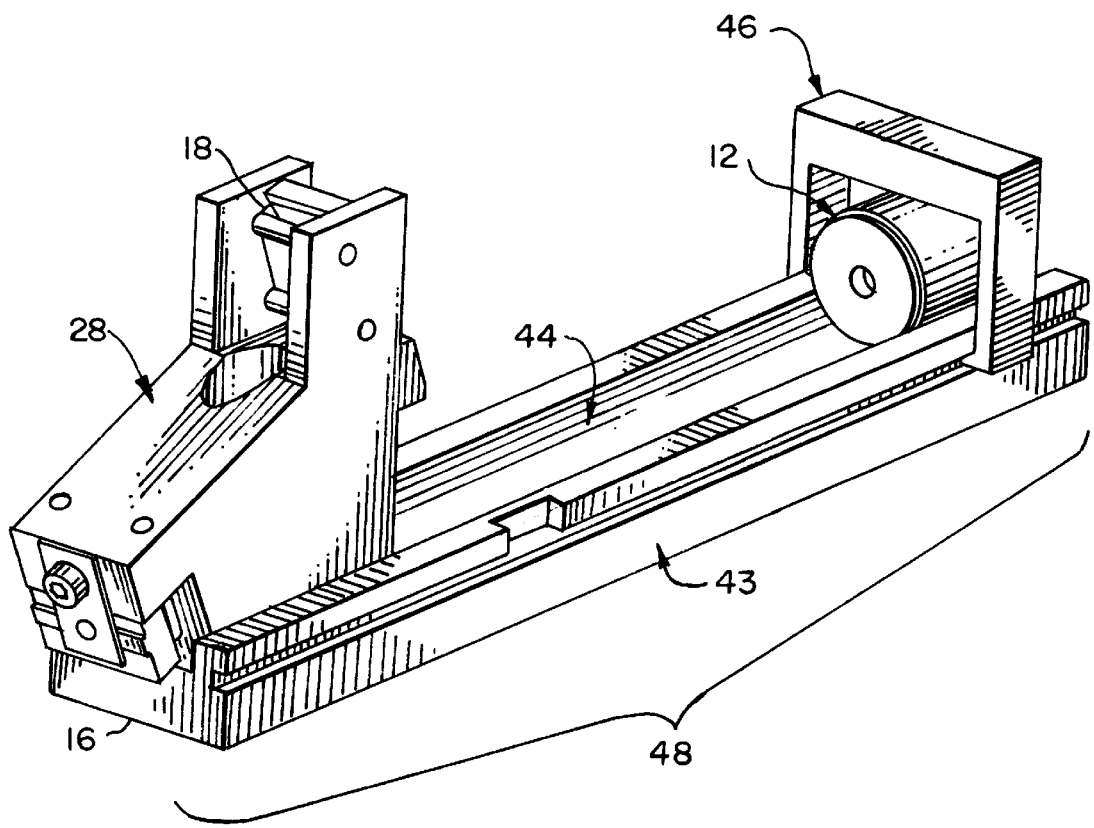
FIG. 3 is a perspective view of the pre-deflector components mounted on a bar.

Now referring to FIG. 3, block 28 is rigidly secured (e.g. bolted) to a bar 43 which has a V-groove 44 machined into it that matches the V-shaped reference surface on the block 28. Mirrors 16 and 18, block 28 and V-grooved bar 43 comprise a rigid subassembly. The optical coupler 12 is positioned in the V-groove 44 at its correct spacing from block 28 and clamped in place using clamp 46. The Z axis position of optical coupler 12 can be easily adjusted by loosening the clamp 46 and sliding the optical coupler 12 along the V-groove 44. The entire assembly 48 shown in FIG. 4 comprises all the pre-deflector optical components rigidly mounted in their proper relative positions. It now remains only to position the pre-deflector components assembly 48 relative to the rest of the printer and fix it in place according to the present invention.

Figure 4:
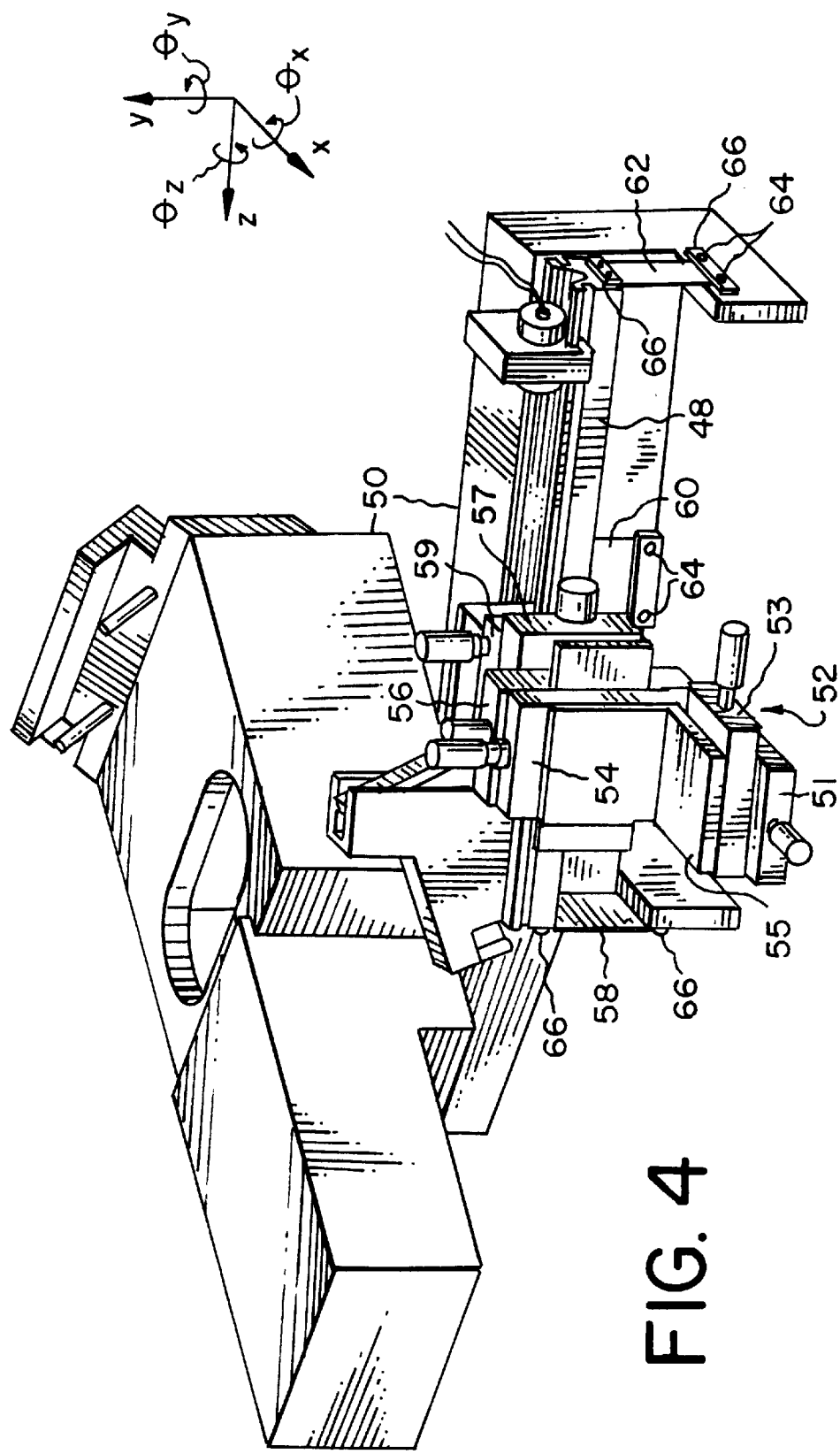
FIG. 4 is a perspective view showing the pre-deflector and postdeflector optical components of a laser printer assembled according to the present invention.

Referring to FIG. 4, the post-deflector components of the laser printer are contained in a post deflector components assembly 50. The precise position of pre-deflector components assembly 48 is carefully adjusted relative to the post-deflector components assembly 50 of the laser printer using an alignment fixture 52 in the factory. For this purpose, the alignment fixture 52 is equipped with an X-Z translation stages 51 and 53, respectively, and a Y translation stage 54, mounted to the Z translation stage by a right angle bracket 55, to move the pre-deflector components assembly 48 by small precise increments in the X, Y and Z directions with respect to the post-deflector components assembly 50. Three rotation stages 56, 57, and 59 are mounted on the Y translation stage to provide precise angular adjustment in the $\theta_z$ $\theta_y$ and $\theta_x$ directions respectively. Some means, such as a target (not shown) is provided in the post-deflector component assembly 50 capable of indicating when the pre-deflector component assembly 48 is precisely aligned with respect to the post-deflector component assembly 50. Then, once it is placed into its correct position, the pre-deflector component assembly is attached to the post-deflector component assembly 50 of the laser printer with three sheet flexures: 58, 60 and 62, arranged as shown in FIG. 4. The sheet metal flexures are quite thin and can be bent elastically quite easily. The flexures 58, 60 and 62 are secured in place by screws 64 and clamp plates 66. The holes (not shown) in the flexures are considerably larger in diameter than the screws 64, to allow for alignment of the component subassemblies in the alignment fixture 52.

The procedure for aligning and fixing the component subassemblies relative to each other is as follows: 1) with the clamping screws 64 loose (not tight), the alignment fixture 52 is used to move the pre-deflector component assembly 48 into its nominally correct position in relation to the post-deflector component assembly 50. The flexibility of the sheet metal flexures 58, 60, and 62 and the oversize holes in the sheet metal flexures permit a moderate amount of motion for the pre-deflector component assembly 48 in every degree of freedom. Once the pre-deflector component assembly 48 and the post-deflector component assembly 50 are in alignment, the clamping screws 64 are tightened. The flexures 58, 60, and 62 now provide a three dimensionally rigid connection between the component subassemblies. The assembled apparatus is then removed from the alignment fixture 52 and the precise alignment between the component subassemblies is maintained by the flexures 58, 60 and 62.

The minimum requirement for achieving a three dimensionally rigid connection using just three sheet flexures is that no two sheet flexures be coplanar. More than three sheet flexures can also be used.

Figure 5:
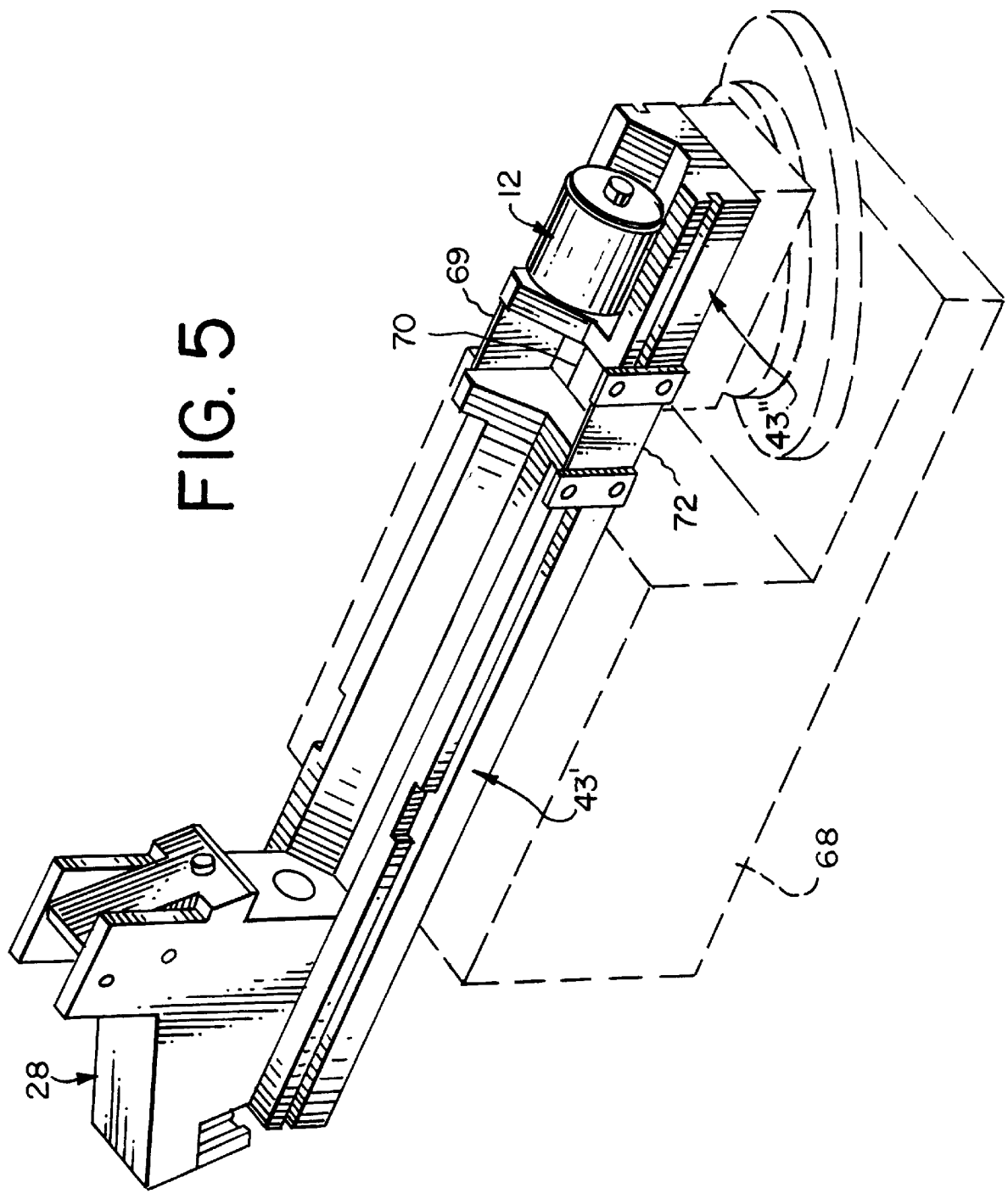
FIG. 5 is a perspective view showing an alternative configuration for the pre-deflector components shown in FIG. 3.

FIG. 5 shows an alternative way of mounting the optical coupler 12 in the event the axis of the beam emitting from the optical coupler 12 is not perfectly aligned with the axis of the optical coupler's cylindrical surface. Bar 43 is split into two sections, 43' and 43". The relative position of the two sections is adjusted in an alignment fixture 68 (shown in phantom) similar to the alignment fixture 52 described above, until the beam emitting from the optical coupler 12 is aligned with the axis of the V-groove of section 42'. The two sections are then fixed in place using three sheet flexures 69, 70 and 72. The pre-deflector component assembly is then assembled with the post-deflector component sub assembly as described above.

The invention has been described in detail with particular reference to certain preferred embodiments thereof, but it will be understood that variations and modifications can be effected within the spirit and scope of the invention.

PARTS LIST

| | |
|---|---|
| 10 | laser printer |
| 12 | optical coupler |
| 13 | fiber optic |
| 14 | beam waist |
| 15 | laser diode |
| 16 | cylindrical mirror |
| 19 | print medium |
| 20 | deflecting mirror |
| 22 | scan lines |
| 24 | flat mirror |
| 26 | cylindrical mirror |
| 28 | print medium |
| 30 | pair of pins |
| 32 | pads |
| 34 | pads |
| 35 | screws |
| 36 | flat springs |
| 37 | screws |
| 38 | flat springs |
| 40 | hole |
| 42 | reference surface |
| 43 | bar |
| 43' | bar |
| 43" | bar |
| 44 | V groove |
| 46 | clamp |
| 48 | assembly |
| 50 | assembly |
| 51 | X translation stage |
| 52 | alignment fixture |
| 53 | Z translation stage |
| 54 | Y translation stage |
| 55 | right angle bracket |
| 56 | $\theta_z$ rotation stage |
| 57 | $\theta_y$ rotation stage |
| 58 | sheet flexures |
| 59 | $\theta_x$ rotation stage |
| 60 | sheet flexures |
| 62 | sheet flexures |
| 64 | screws |
| 66 | clamp plates |
| 68 | alignment fixture |
| 69 | sheet flexure |
| 70 | sheet flexure |
| 72 | sheet flexure |

What is claimed is:

1. A method of assembling a laser printer of a type having pre-deflector components and post-deflector components, comprising the steps of:

a) aligning the pre-deflector components on a bar;

b) aligning the bar with a printer frame assembly having the post-deflector components in an alignment fixture;

c) mechanically attaching flexures between the bar and the printer frame assembly such that the bar and printer frame assembly are constrained from moving relative to each other in a three dimensionally rigid connection; and d) removing the assembled components from the alignment fixture.

2. The method claimed in claim 1, wherein the flexures comprise three non-coplanar sheets.

3. The method claimed in claim 2, wherein the sheet flexures are secured to the components with screws and are provided with oversize holes to provide relative movement between the screws and the sheets prior to tightening the screws.

4. The method claimed in claim 1, wherein step a) further comprising the steps of:

1) aligning a first and second mirror with a block;

2) securing the block to the bar;

3) aligning the bar having the first and second mirrors with an optical coupler in an alignment fixture;

4) mechanically attaching flexures between the bar and the optical coupler such that the bar and optical coupler are constrained from moving relative to each other; and 5) removing the assembled components from the alignment fixture.

5. A laser printer of the type having pre-deflector components and post-deflector components, comprising:

a) a bar on which the pre-deflector components are aligned;

b) a printer frame assembly on which the post-deflector components are mounted; and c) a plurality of flexures attached between the bar and the printer frame assembly such that the pre-deflector components are aligned with the post-deflector components and the bar and printer frame assembly are constrained from moving relative to each other.

6. The laser printer claimed in claim 5, wherein the flexures comprise three non-coplanar sheets.

7. The laser printer claimed in claim 6, wherein the sheet flexures are secured to the bar and printer frame assembly with screws and are provided with oversize holes to provide relative movement between the screws and the sheets prior to tightening the screws.

* * * * *